United States Patent [19]
Hsieh

[11] Patent Number: 4,521,525
[45] Date of Patent: Jun. 4, 1985

[54] SILICON NITRIDE BODIES

[75] Inventor: Martin Y. Hsieh, Palo Alto, Calif.

[73] Assignee: GTE Products Corporation, Stamford, Conn.

[21] Appl. No.: 614,895

[22] Filed: May 29, 1984

[51] Int. Cl.³ .............................................. C04B 35/52
[52] U.S. Cl. ........................................ 501/98; 501/87; 501/97
[58] Field of Search ............................. 501/87, 97, 98

[56] References Cited

U.S. PATENT DOCUMENTS 3,833,389  9/1974  Komeya et al. ...................... 501/98
4,332,909  6/1982  Nishida et al. ....................... 501/87

FOREIGN PATENT DOCUMENTS 0112911  9/1979  Japan ..................................... 264/65
0051766  4/1980  Japan ..................................... 501/97
0032377  4/1981  Japan ..................................... 501/87
0188467  11/1982 Japan ..................................... 501/97
0095662  6/1983  Japan ..................................... 501/97

Primary Examiner—Howard S. Williams
Assistant Examiner—Terryence Chapman
Attorney, Agent, or Firm—Donald R. Castle

[57] ABSTRACT

Compositions consisting of silicon nitride, hard materials such as titanium carbide and titanium nitride, and densifying agents such as lanthanum oxide or lanthanum aluminum compounds are disclosed for silicon nitride bodies.

3 Claims, No Drawings

SILICON NITRIDE BODIES

BACKGROUND OF THE INVENTION

This invention provides silicon nitride compositions from which bodies of near theoretical density can be produced by cold pressing and sintering and by hot pressing.

In general, silicon nitride by itself has limited usage. In order to produce materials for turbines, cutting tools, wear parts and the like, composites are needed which can be pressed to near theoretical density, that is greater than about 96% of the theoretical density. U.S. Pat. Nos. 3,950,464 and 3,953,221 cite compositions of silicon nitride and sintering aids such as yttrium oxide and aluminum oxide to aid in densification. However, with the use of yttrium oxide, the material cannot be cold pressed and sintered to near theoretical density.

The process of this invention involves the use of silicon nitride and hard materials with lanthanum or lanthanum aluminum compounds as densifying agents which can be cold pressed and sintered or hot pressed to near theoretical density.

SUMMARY OF THE INVENTION

In accordance with one aspect of this invention there is provided a composite consisting essentially of from about 3% to about 40% of a hard material selected from the group consisting of titanium carbide, titanium nitride and mixtures thereof, from about 0% to about 2% of aluminum oxide, from about 2% to about 8% lanthanum oxide, and the balance silicon nitride.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

The silicon nitride composition of this invention are produced from mixtures consisting essentially of silicon nitride, hard materials such as titanium carbide, titanium nitride and mixtures thereof, and densifying aids such as lanthanum oxide, mixtures of lanthanum oxide and aluminum oxide, lanthanum aluminate mixture of lanthanum aluminate with either lanthanum oxide or aluminum oxide.

A typical sintered composition consists essentially of, by weight: from about 3% to about 40% with from about 10% to about 30% being preferred, of a hard material selected from the group consisting of titanium carbide, titanium nitride and mixtures thereof, from about 0% to about 2%, with from about 0.5% to about 1.5% being preferred, of aluminum oxide from about 2% to about 8% with from about 4% to about 6% being preferred of lanthanum oxide and the balance silicon nitride. Especially preferred is a composition containing from about 20% to about 40% by weight of titanium carbide as the hard material with from about 2% to about 5% by weight of lanthanum oxide and the balance silicon nitride. Still another preferred composition consists essentially of from about 20% to about 40% by weight titanium nitride as the hard material, from about 2% to about 5% by weight lanthanum oxide, and the balance silicon nitride.

A lanthanum-aluminum compound such as lanthanum aluminate can also be used as the densifying agent. A preferred composition containing lanthanum aluminate consists essentially of, in percent by weight: from about 20% to about 40% of a hard material as given above, from about 3% to about 7% lanthanum aluminate, and the balance silicon nitride. Lanthanum aluminate is preferred over lanthanum oxide because the latter is hydroscopic. A procedure for forming lanthanum aluminate is set forth in U.S. patent application Ser. No. 631,270, filed July 16, 1984 and assigned to the same assignee as this application.

This process of pre-reacting the oxides of aluminum and lanthanum has processing advantages such as prevention or reduction of the segregation of the lanthanum oxide and aluminum oxide in a silicon nitride composition used for slip casting or tape casting. Pre-reacting the oxides of lanthanum and aluminum, thus increasing the reaction kinetics of the sintering process.

The oxide of lanthanum used in this invention can be any oxide of lanthanum. A lanthanum oxide sold by Molycorp, a subsidiary of Union Oil of California, under the trade name of Molycorp 5200 is suitable. The oxide of aluminum used in this invention can be any oxide of aluminum. A suitable aluminum oxide is sold by Baikowski International Corporation under the trade name of CR-30. The admixture of lanthanum and aluminum oxides is formed by any conventional method such as ball milling, blending and the like which will result in a uniform homogeneous mixture.

As previously mentioned, the process of pre-reacting the oxides of lanthanum and aluminum reduces the potential for segregation of the oxides in certain processes. Therefore, the weight ratio of lanthanum oxide to aluminum oxide can vary from about 1 to 10 to about 10 to 1 and the benefits of this invention can be achieved. When the mole ratio of lanthanum oxide to aluminum oxide is about 1, the compound having the formula $LaALO_3$ is formed and subsequently utilized in the processes, the potential for segregation is minimized. Generally it is preferred to have 1 mole of lanthanum oxide per mole of aluminum oxide in order to achieve a single phase material. However, even if a single phase material is not obtained, many of the advantages of this invention can be achieved. Therefore, the mole ratio of lanthanum oxide to aluminum oxide can vary from about 1 to 12 to about 12 to 1 or preferably about 1 to 5 to about 5 to 1.

While elevated temperatures, that is above 1500° C. can be used, excessively high temperatures such as above 1700° C. can result in volatilization of the lanthanum oxide. Heating times will vary according to the temperatures, for example, at a temperature of about 1300° C. and a time of about 20 hours only about 65% of the materials are reacted while at about 1450° C. essentially all of the oxides react in about 9 hours. The higher temperatures and longer heating times result in the complete conversation to the lanthanum aluminate. Generally heating temperatures are above about 1000° C.

EXAMPLE

Batches consisting of about 326 parts of Molycorp 5200 lanthanum oxide and about 102 parts of CR-30 aluminum oxide are mixed and heated in order to react to the above materials. The resulting material is analyzed to confirm the presences of lanthanum aluminate.

The results of the analyses of the reacted material are given below for each temperature and reaction time.

| Sample # | Heating Temperature °C. | Heating Time Hr. | Phases present |
|---|---|---|---|
| 1 | 1080 | 3 | 35.5% LaAlO$_3$; 64.5% La$_2$O$_3$ |
| 2 | 1300 | 20 | 64.5% LaAlO$_3$; 35.5% La$_2$O$_3$ |
| 3 | 1430 | 9 | 100% LaAlO$_3$ |
| 4 | 1430 | 20 | 100% LaAlO$_3$ |

It can be seen that the higher heating temperatures and times insure complete conversion to LaAlO$_3$. This reactive material can be mixed with silicon nitride and conventional binders for tape casting and with organic or aqueous mixtures for slip casting.

The silicon nitride can be any powdered silicon nitride. For example, a suitable material is a high purity silicon nitride having a purity of at least about 99.9% such as SN502 which is made by GTE Products Corporation, Chemical and Metallurgical Division. Impure silicon nitride containing up to 2% impurity can also be used for some purposes. The admixture of silicon nitride, hard material and densifying agents is formed by any convention method such as ball milling, blending and the like which will result in a uniform homogeneous mixture. The silicon nitride bodies can be made by either cold pressing and sintering, by hot pressing, or by hot isostatic pressing. The green silicon nitride body is then sintered at from about 1700° C. to about 1800° C. with from about 1750° C. to about 1780° C. being preferred. In hot pressing, the pressing temperature is generally at from about 1700° C. to about 1750° C. with about 1725° C. being preferred. Generally pressures of from about 4000 to 5000 psi are used and the time required is generally 4 hours or less. The silicon nitride bodies resulting from the above processes have densities equal to at least about 96% of the theoretical density for a particular composition.

To more fully illustrate this invention, the following non-limiting examples are presented. All parts, portions, and percentages are on a weight basis unless otherwise stated.

EXAMPLE 1

Several compositions of silicon nitride SN502 are formed into a green material and then sintered at about 1780° C. for about 4 hours. The sintered densities for the respective compositions are given in the table below with the corresponding theoretical densities.

| Part # | Composition Balance essentially SN 502 Si$_3$N$_4$ | | | | Sintered Density g/cc | Theoretical Density g/cc | % of Theoretical Density |
|---|---|---|---|---|---|---|---|
| | % TiC | % TiN | % La$_2$O$_3$ | %* LaAlO$_3$ | | | |
| 1 | 40 | | | 3.6 | 3.802 | 3.763 | 101 |
| 2 | 20 | | | 6.4 | 3.371 | 3.498 | 96.4 |
| 3 | 40 | | | 4.8 | 3.874 | 3.770 | 102.7 |
| 4 | | 40 | | 3.6 | 3.718 | 3.830 | 97.1 |
| 5 | | 20 | | 6.4 | 3.522 | 3.527 | 99.86 |
| 6 | | 40 | | 4.8 | 3.829 | 3.838 | 99.77 |
| 7 | 20 | 20 | | 4.8 | 3.783 | 3.804 | 99.45 |
| 8 | | 40 | 2.4 | | 3.797 | 3.830 | 99.1 |
| 9 | | 20 | 4.8 | | 3.506 | 3.527 | 99.4 |
| 10 | | 40 | 3.6 | | 3.814 | 3.838 | 99.4 |
| 11 | 20 | | 3.2 | | 3.518 | 3.518 | 100 |

*LaAlO$_3$ is equivalent to about 75% La$_2$O$_3$ and about 25% Al$_2$O$_3$. All parts have a sintered density of greater than about 96% of the theoretical for the respective compositions.

EXAMPLE 2

Several compositions of silicon nitride Sn502 are hot pressed at about 1725° C. at a pressure of about 4500 psi for about 2 to about 4 hours. The densities for the respective compositions are given in the table below with the corresponding theoretical densities.

| Part # | Composition Balance essentially SN 502 Si$_3$N$_4$ | | | | Sintered Density g/cc | Theoretical Density g/cc | % of Theoretical Density |
|---|---|---|---|---|---|---|---|
| | % TiC | % TiN | % La$_2$O$_3$ | %* LaAlO$_3$ | | | |
| 1 | 39.3 | | 3.642 | 0.607 | 3.8493 | 3.7628 | 102.3 |
| 2 | | 40.7 | 3.56 | 0.59 | 3.8348 | 3.8483 | 99.65 |
| 3 | 39.3 | | 3.642 | 0.607 | 3.8493 | 3.7628 | 102.3 |
| 4 | | 40.7 | 3.56 | 0.59 | 3.8348 | 3.8483 | 99.65 |

*All parts have a density of greater than about 96% of the theoretical for the respective compositions.

While there has been shown and described what are at present considered the preferred embodiments of the invention, it will be obvious to those skilled in the art that various changes and modifications may be made therein without departing from the scope of the invention as defined by the appended claims.

What is claimed is:

1. A composite consisting essentially of, in percent by weight: from about 20% to about 40% of a hard material selected from the group consisting of titanium carbide, titanium nitride, and mixtures thereof, from about 3% to about 7% lanthanum aluminate, and the balance silicon nitride.

2. A silicon nitride composite consisting essentially of, in percent by weight, from about 3% to about 40% titanium carbide, from about 0% to about 2% aluminum oxide, from about 2% to about 8% lanthanum oxide, and the balance silicon nitride, said composite having a density of about 100% of theoretical.

3. A composite according to claim 1 consisting essentially of in percent by weight: from about 20% to about 40% titanium carbide, from about about 2% to about 5% lanthanum oxide and the balance silicon nitride.

* * * * *